United States Patent
Müssig et al.

(10) Patent No.: US 6,777,490 B2
(45) Date of Patent: *Aug. 17, 2004

(54) PROCESS FOR PREPARING A PRESSURE-SENSITIVE SELF-ADHESIVE COMPOSITION WHEREIN TACKIFIERS IN DISPERSED, MELTED OR SOLID FORM ARE MIXED WITH NATURAL RUBBER LATEX

(75) Inventors: Bernhard Müssig, Seevetal (DE); Zygmut Kozaczka, Hamburg (DE); Dieter Zielske, Barmstedt (DE); Jochen Stähr, Hannover (DE); Ralf Hirsch, Quickborn (DE)

(73) Assignee: tesa AG, Hamburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/320,097

(22) Filed: May 26, 1999

(65) Prior Publication Data
US 2003/0207992 A1 Nov. 6, 2003

(30) Foreign Application Priority Data
May 29, 1998 (DE) ......................... 198 24 071

(51) Int. Cl.⁷ .................. C09J 107/02; C09J 7/02

(52) U.S. Cl. .................. 525/55; 525/53; 525/54; 525/191; 525/222; 524/502; 524/523; 524/524

(58) Field of Search ................ 524/502, 523, 524/524; 525/53, 54, 55, 191, 222

(56) References Cited

FOREIGN PATENT DOCUMENTS

| DE | 1954214 | * | 5/1971 | ............ C08D/9/08 |
| JP | 53067742 | * | 6/1978 | ............... 524/518 |
| JP | 54076632 | * | 6/1979 | ............... 524/518 |
| JP | 54076633 | * | 6/1979 | ............... 524/518 |

OTHER PUBLICATIONS

Chemical Abstracts, vol. 89, No. 16, Oct. 16, 1978 Columbus, Ohio, US; abstract No. 130696, XP002115935 *Zusammenfassung* JP 53 067742 A (Nitto Electric Ind Co).
Chemical Abstracts, vol. 91, No. 20, Nov. 12, 1979 Columbus, Ohio, US; abstract No. 158762, XP002115936 JP 54 076632 A (Nitto Electric Ind Co) Jun. 10, 1979.
D.C. Blackley: "Polymer Latices, vol. 3: 1 Applications of latices" 1997, Chapman & Hall, London GBX XP002115966, Seite 489–492; Tabelle 22.3.

* cited by examiner

Primary Examiner—Kelechi C. Egwim
(74) Attorney, Agent, or Firm—Norris McLaughlin & Marcus

(57) ABSTRACT

Process for preparing a pressure-sensitive adhesive composition, characterized in that tackifiers in dispersed, melted or solid form are mixed with natural rubber latex, the water content being not more than 45% by weight.

14 Claims, No Drawings

PROCESS FOR PREPARING A PRESSURE-SENSITIVE SELF-ADHESIVE COMPOSITION WHEREIN TACKIFIERS IN DISPERSED, MELTED OR SOLID FORM ARE MIXED WITH NATURAL RUBBER LATEX

PRIOR ART

Natural rubber is the ideal elastomer for producing adhesive tapes provided high ageing resistance is not a requirement. Particular advantages are the low price of the elastomer the low price of suitable tackifiers (resins and so on)

the good balance between the physical properties such as unrolling force, shear strength, tack and bond strength.

To date it has proved possible to process natural rubber only from solution. There has been no lack of attempts to process natural rubber as an aqueous system as well. Technical realization fails owing to the extreme shear sensitivity of the latex; only by adding fairly large amounts of surface-active substances or by blending with other latices is it possible to achieve a certain measure of processability, and then only at the expense of a severe loss in the target profile of properties.

Until now, the processing of natural rubber compositions from the melt was impossible. If the preparation of hot melt PSA (pressure-sensitive adhesive) compositions is attempted, then homogenization necessitates strong and lengthy shearing. This causes severe degradation and hence a loss in performance of the adhesive tape, despite which it is impossible to wholly avoid specks of rubber. Improving the homogeneity by shearing (masticating) the rubber, then preparing a batch with a portion of the tackifier and subsequently processing this batch in a further step with the addition of further raw materials to the adhesive composition has been tried: this technique is described in WO 94/11175. WO 95/25774 is further evidence that the processing of non-thermoplastic material is possible only with mastication, which has the deleterious effect of degrading the polymer. A further disadvantage of all process trials with solid rubber is the necessity of batch operation, which drives up the production and quality control costs. Adhesive compositions of this kind have so far been used only to manufacture low-grade cloth adhesive tapes (duct tapes). Because of these problems, thermoplastic elastomers (styrene-diene block copolymers) have been developed which go a long way towards avoiding these drawbacks. However, they result in product properties markedly different from those of natural rubber. For instance, it has so far been impossible in this way to produce high quality products such as readily redetachable film adhesive tapes or paper-based adhesive tapes for painting. A significant defect of such adhesive compositions comprising thermoplastic rubbers is their low heat resistance. Ageing resistance is likewise much less favourable than in the case of natural rubber adhesive compositions. Furthermore, in terms both of the elastomer and of the suitable tackifiers, such formulations are significantly more expensive than those based on natural rubber.

Natural rubber is produced as latex. The commercial solid rubber is obtained from latex by precipitation. Without the use of solvent it is impossible to mix solid rubber in the form of bales or pellets with tackifiers, fillers, antioxidants, plasticizers, etc. with complete homogeneity and above all to avoid the associated shearing and degradation of the elastomer. If the latex is mixed homogeneously with a dispersion of these additives, the problems of both homogeneous mixing of the components and shearing and degradation of the elastomer disappear. Unfortunately, such water-based adhesive compositions cannot be used in practice for coating on production lines owing to their extreme coagulation sensitivity: even during processing, gel particles, or complete coagulation, occur.

Process of the Invention

When natural rubber latex, melted or finely particulate tackifiers and any further components are mixed in a mixer, compounder, extruder or the like, the mixture is surprisingly homogeneous, because the latex mixture does not coagulate before the end of complete addition and thorough mixing. In the specific case of preparation, it is advantageous to make a correct choice of the sequence and amount of the components and not to subject the mixture to any more shear stress than is necessary, since under adverse conditions it is possible to provoke premature coagulation. The stability can be raised by adding water, ammonia, alkali metal hydroxide solutions, or surface-active substances such as emulsifiers. In batch operation the best thing is generally not to add the latex and the other components in alternation but instead either to introduce all of the latex at the start and then to mix in the remaining components or to introduce these components as a mixture at the start and then to add all of the latex. If the latex is introduced at the start, then the first addition should be the plasticizer (if required); this applies in particular to mineral oils or liquid hydrocarbon resins. In this way it is easy to mix all of the desired components before the rubber solidifies through coagulation. This is highly surprising, since not only is the latex shear-sensitive when stirred thoroughly but to the skilled worker a mixture which has a solids content of 80% or more and yet can still be stirred is unimaginable.

Depending on formulation, the adhesive compositions of the invention are still liquid and hence can be processed directly using an applicator unit, ball together tackily, or form a non-tacky and readily conveyable solid. In general there is no discernible separation (e.g. emergence of the aqueous phase). When using Hercolyn D-E, for example, liquid mixtures with a water content of from 10 to 50% by weight are produced which can be used for coating but require subsequent drying after the coating operation. The use of very high proportions of fillers or pigments results in solid mixtures which can be conveyed without tack. These solid or liquid mixtures can be supplied, for example, to a twin-screw extruder or planetary gear extruder, which removes the residual water in a vent section and then feeds a coating die or roll-type applicator unit. The applicator unit then coats the substrates directly or indirectly (for example, coating onto a roller or liner and transfer to the substrate by lamination) or applies the composition to a liner, without a backing. Dewatering can also be achieved by means of heat or subatmospheric pressure in a stirring unit, such as compounders or continuous mixers; internal mixers (Banbury) are less suitable because it is more difficult to remove the adhesive composition. The compositions (unless highly filled or pigmented) have a pressure-sensitive tack even without compounding; in other words, diffusion is sufficient to allow molecular penetration of rubber and resin. This shows how easy it is, in the manner of the invention, to achieve homogeneity without the need for extreme shearing as in the case of solid rubber. Prolonged compounding in batch operation is therefore unnecessary; just the short residence time in an extruder is sufficient, so enabling the manufacturing process to be continuous. It is possible to carry out the mixing of the latex with the other components and the dewatering in one extruder. The resin may, for example, be passed through a Condux mill downstream of the weigh feeder and then onto the feed zone; alternatively, the resin melt can be pumped in at just under 100° C.

Because of the short residence times when the adhesive composition is sheared, the rubber undergoes little if any degradation. The adhesive compositions of the invention therefore have K values of in particular $\geq 80$, preferably $\geq 125$ and, with particular preference, $\geq 140$, which give rise to good shear strengths. Even K values of about 160 are possible for adhesive compositions, whose shear strength far exceeds that even of good conventional solvent-based compositions. The K values of conventional solvent-based compositions lie approximately between 130 and 150, but may even be considerably lower if CV rubber is used. A particularly surprising fact was that the compositions of the invention, with such high K values, can be used for coating without problems. It is supposed that the rubber particles (of the former latex droplets) absorb resin and plasticizer by swelling, without the rubber particles undergoing full mutual penetration in the process, and owing to the entanglement the viscosity rises as sharply as expected from the K value. By adding rubber latices with low Mooney values (as used, for instance, to prepare CV 50 with a Mooney value of 50) the K values of the compositions can be regulated further, so enabling the processing properties and adhesion properties to be matched to requirements.

The coating thickness of the adhesive compositions can be in particular between 2 g/m$^2$ and 3 kg/m$^2$. Depending on application and backing, coating thicknesses of from 12 to 500 g/m$^2$ are particularly suitable, preferably between 20 and 200 g/m$^2$.

Since with this process it is possible to obtain shear strengths varying from adequate to outstanding, additional crosslinking is unnecessary. In any given case it may be sensible to carry out crosslinking, for example with gamma rays, ultraviolet radiation or electron beams, or with crosslinking resins. This is possible with high-temperature applications such as for adhesive tapes for painting motor vehicles or when using rubber latex with a very low Mooney viscosity. Since irradiation may damage the backing the dose should be kept as low as possible. The radiation dose can be reduced by using photoinitiators or by adding esters of allyl alcohol, of methacrylic acid or of acrylic acid to the adhesive composition.

Raw Materials

For the adhesive composition it is possible in addition to rubber and tackifiers to use additives as well, such as fillers, antioxidants, plasticizers or pigments, as are described, for example, in Handbook of Pressure Sensitive Adhesive Technology, ed. Donatas Satas, N.Y. 1989, or rubber additives such as lubricants and masticating agents.

The known natural rubber latices are suitable for the process of the invention and for the adhesive tapes produced thereby. It is advisable to filter the latex before processing. The natural rubber latices concerned have been concentrated, chemically treated and/or treated with additives; for further details see The Natural Rubber Formulatory and Property Index, ed. Malaysian Rubber Producers' Research Association, 1984, Ullmann's Encyclopedia of Chemical Industry, Vol. 23, p. 221 ff., VCH Weinheim 1993, and Encyclopedia of Polymer Science and Engineering, Vol. 14, page 687 ff., J. Wiley & Sons, 1988. The use of untreated fresh latex, although possible, is fairly impracticable owing to the high transportation costs. Therefore, concentrated latices are preferred. The commonest concentration technique is centrifugation. Such a technique, through the reduction of non-rubber constituents, is particularly suitable for adhesive compositions. The use of special grades with a particularly low protein content (DPNR=deproteinized rubber) is possible but not rational on economic grounds. Revertex latex prepared by concentrated evaporation is suitable; experiments have indicated that for use in accordance with the invention it should be diluted with water to about 60%. It is less sensitive to shearing than is centrifuge latex, but the bond strengths of the adhesive compositions produced from it are in some cases lower than those of similar compositions prepared using centrifuged latex. Also suitable are latices prepared by creaming (for example, by treatment with ammonium alginate) or electrodecantation. For use in accordance with the invention, preference is given to the use of centrifuge latex. A grade which has been found to be particularly suitable is high ammonia (HA) or full ammonia with 0.5–0.7% ammonia. The grade LA-TZ (low ammonia with about 0.2% ammonia and thiuram stabilization) is almost as suitable but is slightly more sensitive in processing. To control the molecular weight of the rubber the natural latex can be treated with chemicals such as hydroxylamine hydrochloride, which reduces the shear strength of the adhesive composition but has a positive effect on its processing viscosity. A pale colour can be obtained by treatment with bleaches such as sodium hydrogen sulphite. SP/PA grades (superior processed rubber with prevulcanization) such as Revultex can additionally be used, and lead to a higher shear strength of the adhesive composition. OENR (oil-extended natural rubber) is an alternative to the admixture of plasticizers in the process of the invention. There are certain latices comprising synthetically prepared isoprene rubbers which are intended to fall within the designation natural rubber latex for the purposes of the patent. These are, for example, latices of high-cis-polyisoprene, or natural rubber which has been epoxidized or grafted (for example, with methyl methacrylate, such as Hevea Plus MG 49).

In addition to natural rubber latex it is also possible in addition to use one or more synthetic latices based, for example, on SBR, cSBR, BAN, NBR, EVAc, SBS, SEBS, SIS, PU, BR, IIR, ACM or XIIR.

In addition to natural rubber latex it is also possible in addition to use one or more semi-liquid to solid elastomers. These are, for example, SBR, cSBR, BAN, NBR, EVAc, SBS, SEBS, SIS, PU, BR, IIR, ACM or XIIR or natural rubbers such as crepe, SMRL, CV 40, CV 50, and chemically or mechanically degraded types such as Lorival® or liquid synthetic polyisoprenes. Their proportion must not of course be too high, especially in the case of grades having high Mooney viscosity, since otherwise the problems described at the outset occur. If a natural rubber latex PSA composition comprising conventional rubber is modified by natural rubber latex, it is possible to reduce the drawbacks such as high melt viscosity and low shear strength of the adhesive.

Examples of suitable tackifiers are hydrocarbon resins formed, for example, from unsaturated C5 or C7 monomers, terpene-phenolic resins, terpene resins formed from raw materials such as α- or β-pinene, rosin and its derivatives, such as disproportionated, dimerized or esterified resins, in which context it is possible to employ glycols, glycerol or pentaerythritol, and others, as listed in Ullmanns Enzyklopatdie der technischen Chemie, Volume 12, pp. 525–555 (4th ed.), Weinheim.

Examples of suitable fillers and pigments are carbon black, titanium dioxide, calcium carbonate, zinc carbonate, zinc oxide, silicates, silica, metal powders, and also solid and hollow beads of glass, polymer or ceramic.

Examples of suitable plasticizers are aliphatic, cycloaliphatic and aromatic mineral oils, liquid rubbers (e.g. nitrile, polybutadiene or polyisoprene rubbers), liquid polymers of butene and/or isobutene, acrolates, polyvinyl ethers, liquid resins and soft resins based on the raw materials for tackifier resins, lanolin, and other waxes or liquid silicones.

Examples of suitable crosslinking resins are phenolic resins or halogenated phenolic resins, melamine and formaldehyde resins, maleimides and radiation-curable agents such as triallyl cyanurate, and polyfunctional esters of acrylic and methacrylic acid.

Backings

Examples of customary films suitable for coating for adhesive tapes are those comprising polypropylene, especially monoaxially and biaxially oriented polypropylene, polyethylene, polyesters such as PEN and PET, rigid and plasticized PVC, polyimide, or metal foils, and also films prepared from such materials and other raw materials by coextrusion or mixing.

Also suitable for coating are nonwovens of, for example, polypropylene, polyester, polyamide or cellulosic fibres.

Papers and wovens are particularly suitable, since they have especially good heat stability and tensile strength and hence can also be processed using a twin-roll applicator unit. Examples of papers suitable for coating are those comprising natural fibres, such as cellulose, but also those using synthetic fibres, which are preferably impregnated with, for example, NBR, SBR, polyurethane latex, PVD latex or acrylate latex, alone or in combination with paper softeners such as polyols and their derivatives or reactive resins (based on formaldehyde, for example). Particularly suitable papers are those having an elongation of break of >5%, which is achieved by creping and other manufacturing techniques, which are particularly suitable for bonding on curved surfaces.

Wovens are also suitable for coating and may consist, for example, of synthetic fibres such as rayon, polyamide or polyester, or of natural fibres such as cotton or hemp.

The backings can also be laminates prepared by lamination using materials referred to above. The backings may also be modified by radiation treatment.

All of the said backings can be provided with surface treatments. Examples of such treatments are, to promote adhesion, corona, flame or plasma treatments, coatings of solutions or dispersions, or liquid radiation-curable materials. Further possible coatings are printed coatings and anti-adhesion coatings, examples being those of crosslinked silicones, acrylates (e.g. Primal™ 205), polymers with vinylidene chloride or vinyl chloride as monomer, or stearyl compounds, such as polyvinyl stearylcarbamate, chromium stearate complexes (e.g. Quilon™ C), or reaction products of maleic anhydride copolymers and stearylamine.

The term backings here is also intended to refer to release films and release papers which are suitable for provisionally carrying the adhesive composition before its transfer to the desired substrate in a subsequent step.

Test Methods

The results of measurement given in the examples were determined under standard conditions in accordance with DIN 50014-23/50- Part 1. The bond strength to steel or the reverse of the backing was tested in accordance with PSTC 1. The application rate was determined by differential weighing, after washing off the adhesive composition with hexane. The shear strength (holding power) was determined essentially in accordance with PSTC 7 at 23° C. but with variations: method A with a load of 10 N and a bond area 20 mm long and 13 mm wide, method B with a load of 20 N and a bond area 20 mm long and 13 mm wide, and method C with a load of 10 N and a bond area 25 mm long and 25 mm wide.

The rubber was characterized using the K value and the Mooney viscosity. Calculation of the K value from the relative viscosity is described in Fikentscher, Cellulose-Chemie 13 (1932), p. 58 ff. and Polymer 8 (1967), p. 381 ff. The viscosity of a 1% strength solution of the natural rubber in toluene is measured in a Vogel-Ossag viscometer in accordance with DIN 51561. Prior to dissolution in toluene, the latex was dried in a thin film on a silicone paper at 90° C. In the case of adhesive composition the initial weight was chosen so as to give a calculated 1% of rubber in the toluene (the other constituents of the adhesive composition are reckoned as solvent). The solutions were filtered before measurement. The Mooney viscosity was tested in accordance with ASTM D 1646.

EXAMPLES

Example 1

71.7 kg of centrifuge latex (Weber & Schaer, high ammonia grade) were charged to a vessel containing a straight-arm paddle agitator, and then 1 kg of Santovar A (Monsanto, antioxidant), 15 kg of Zincoxid Weißsiegel (Grillo Zinkoxid, zinc oxide) and 41 kg of Escorez 1202 (Exxon, hydrocarbon resin, powdered before use to a particle size of <1 mm) were added in portions. During the addition of the resin there was a sharp rise in viscosity until, finally, a solid moist lump formed around the agitator. This lump was kneaded in a double Z blade compounder at 130° C. for 15 minutes, with the steam which formed being driven off by blowing in nitrogen.

The applicator unit consists of two heated steel rolls with downstream cooling roll, web tension and lateral control device, and winding/unwinding means. The treated paper backing SC/042 P (60 g/m$^2$, Gessner) was wound around a roll and then fed into the nip from above at 10 m/min, the rolls having been preheated to 170° C. The predried adhesive composition from the compounder was fed continuously with a discharge screw into the nip, from above, and was transferred in the nip onto the paper in a thin film.

The product was wound up and then cut into 19 mm wide roll samples.

Technical data of the resultant sample:

Application rate: 50 g/m$^2$

Bond strength, steel: 3.5 N/cm

Bond strength, reverse: 2.0 N/cm

Holding power, steel (method C): >3000 min

Bonding test: An aluminium panel was coated with KH body paint VWL 041ALD630 041 12/FD 07 9103-0101, stored in a circulating-air oven at 160° C. for 30 minutes, and then cooled to room temperature. A paper mask was then bonded to the coated panel with a strip of the adhesive tape under test. This assembly was stored in an oven at 60° C. for 1 hour. After cooling to 23° C., the adhesive strip was readily detachable from the panel without residue.

Further samples were bonded to glass and Resopal. After 24 hours at 25° C. the adhesive strips can easily be peeled off without residue.

Example 2

An adhesive composition was prepared whose makeup is like that in Example 1. It was prepared using a twin-screw extruder (modified Leistritz extruder). The feed port (1st zone) was fed continuously with the latex, preheated to 90° C., the antioxidant and the filler. The remaining raw materials were premixed in a mixer at 100° C. and this batch was supplied continuously as a melt to the second zone. In the 3rd and 4th zones there was a vent section for removing the water. The dry adhesive composition was discharged from the die (5th zone) directly into the nip of a roll applicator unit. Temperature: 1st zone 100° C., 2nd zone 100° C., 3rd zone 130° C., 4th zone 170° C., 5th zone 170° C. The substrate chosen for coating was a desized undyed rayon plain-woven with a sett of 30/30 threads/cm from 20/20 tex yarn. The bond strength to steel was measured as 4.1 N/cm and the application rate as 115 g/m².

Example 3

31.7 kg of centrifuge latex (Metallgesellschaft, high ammonia grade) and 40 kg of Kagetex KV 50 (centrifuge latex from Metallgesellschaft, Mooney 50, K value 108), 1 kg of Santovar A (Monsanto, antioxidant), 15 kg of Zinkoxid Weißsiegel (Grillo Zinkoxid, zinc oxide), 3 kg of Vulkaresen PA 130 (Hoechst, vulcanization resin) and 47 kg of Escorez 1202 (Exxon, granulated hydrocarbon resin) were supplied to a planetary gear extruder having 3 segments. The water was evaporated off at 145° C., the components were mixed and the resultant melt was fed to the nip of a roll applicator unit.

The paper backing employed was Endura 92785 (specialty paper board). Coating took place as in Example 1 with subsequent vulcanization at 150° C. for 20 seconds.

Technical data of the resultant sample:

Application rate: 45 g/m²

Bond strength, steel: 3.1 N/cm

Bond strength, reverse: 2.5 N/cm

Holding power, steel (method B): 1200 min

Example 4

Centrifuge latex was introduced into a vessel and then plasticizer, antioxidant and resin powder were added with slow stirring. The compositions were transferred to a compounder and dewatered at 150° C. with addition of nitrogen for 15 minutes. The hot dry composition obtained was fed between a pair of rollers in a triple-roll applicator unit and transferred to a 25 μm thick polyester film (Mylar A, DuPont) against the third roll. The film had been pretreated on one side with isocyanate and cyclorubber as adhesion promoter and on the other side with polyvinyl stearylcarbamate (Release Coat K from Hoechst) as a release layer. The resultant sample was subjected to electron beam treatment under nitrogen (dose: 20 kGy).

The table shows the composition of the adhesive compositions and the properties of the resultant adhesive tape.

| Raw material/supplier | Parts by weight |
| --- | --- |
| Centrifuge latex HA | 43.8 |
| Natural rubber CV 50 | 24.0 |
| MBG 212/Hercules | 46.0 |
| Hercures A 10/Hercules | 7.0 |
| Irganox 1010/Ciba-Geigy | 0.3 |
| ZDBC | 0.6 |
| Application rate (g/cm²) | 23 |
| Bond strength, steel (N/cm) | 2.6 |
| Holding power (method B) (min) | 225 |

Example 5

The solid constituents of the composition in powder form were placed in a double Z blade compounder at 40° C. and the latex was added with stirring. The adhesive composition was used for coating as in Example 4. The substrate chosen was 35 μm thick polypropylene film (MB 250, Mobil) which had been pretreated on both sides with isocyanate and cyclorubber as adhesion promoter. Coating was carried out under the same conditions as in Example 4 except that the adhesive composition was applied to Purex Release Film Type 46 (Teijin, polyester film coated on both sides with low-release silicone) and transferred to the backing film. In the subsequent operation, the other side of the backing film was provided with adhesive composition as well, and a release film was laminated on in the course of winding. The measurements were made on the open side of the resultant double-sided adhesive tape.

| Raw material/supplier | Parts by weight |
| --- | --- |
| Centrifuge latex Full Ammonia/Nordmann-Rassmann | 83.8 |
| MBG 212/Hercules | 46.0 |
| Bevilite 20 L/Bergvik | 7.0 |
| Irganox 1010/Ciba-Geigy | 0.3 |
| Perkazit ZDBC/Akzo | 0.6 |
| Application rate (g/cm²) | 25 |
| Bond strength, steel (N/cm) | 2.4 |
| Holding power (method B) (min) | 700 |

Example 6

Centrifuge latex was introduced into a vessel and then plasticizer, antioxidant and resin powder were added with slow stirring. The adhesive composition was a highly viscous liquid and was applied by coating to treated paper backings on a solvent-type laboratory coating unit with coating bar. Drying took place at 1 m/min in a 4 m long tunnel at 135° C.

| Raw material/supplier | Example 6 |
| --- | --- |
| Centrifuge latex Full Ammonia/Weber & Schaer | 80.0 |
| Revultex latex/Metallgesellschaft | 1.8 |
| Hercolyn D-E/Hercules | 10.0 |
| Piccotac 212/Hercules | 45.0 |
| Lowinox 22 M 46/Chem. Werke Lowi | 0.2 |
| Application rate (g/cm²) | 70 |
| K value of the dry adhesive composition | 162 |
| Bond strength, steel (N/cm) | 2.0 |
| Holding power (method A) (min) | 8511 |

Examples 7 to 10

Centrifuge latex was introduced into a vessel and then plasticizer, antioxidant, resin powder and, finally, filler were added with slow stirring. The adhesive compositions ranged from semi-liquid consistency to tacky solids, while those with filler formed small tack-free lumps. The adhesive compositions were applied as described in Example 1 to SC/042 P paper in a twin-roll applicator unit. The table shows the composition of the adhesive compositions in % by weight and the properties of the resultant adhesive tape.

| Raw material/supplier | Example 7 | Example 8 | Example 9 | Example 10 |
|---|---|---|---|---|
| Centrifuge latex Full Ammonia/Weber & Schaer | 81.8 | 81.8 | 86.4 | 72.7 |
| Hercures A 10/Hercules | 10.0 | — | — | — |
| Nipol 1312 LV/Zeon Chemical | — | 10.0 | — | 7.0 |
| Ondina G 33/Shell | — | — | 5.0 | — |
| Piccotac 212/Hercules | 45.0 | 45.0 | 47.5 | 31.0 |
| Irganox 1010/Ciba-Geigy | — | — | — | 1.0 |
| Lowinox 22 M 46/ Chem. Werke Lowi | 0.2 | 0.2 | 0.2 | — |
| Chalk Microsöhl 40/ Vereinigte Kreidewerke Damman | — | — | — | 21.0 |
| Application rate (g/cm$^2$) | 80 | 25 | 20 | 125 |
| K value of the dry adhesive composition | 159 | 167 | 149 | — |
| Bond strength, steel (N/cm) | 2.2 | 2.2 | 1.2 | 0.9 |
| Holding power (method A) (min) | 15545 | 462 | 551 | 2540 |

K value of the dried latex charge used (after drying): 165.

Comparative Example 1

The formulation was made in a similar way to Example 1 but replacing the centrifuge latex by solid rubber (grade SMRL 5, Wallace plasticity $P_0$ 42, K value 145, granulated with 3% talc to a size of 8–12 mm). Calculation basis: 1 kg of latex corresponds here to 0.6 kg of solid rubber, since the centrifuge latex contains about 60% rubber and about 1.5% accompanying non-volatile substances. The rubber was initially swollen in a compounder with slow addition of hexane, then the remaining raw materials were added and, finally, a spreadable adhesive composition was obtained with hexane. The solids content was measured at 22% by weight and the K value at 140. Coated out onto the paper specified in Example 1, the sample exhibited an adhesive application rate of 42 g/m$^2$, a holding power (method C) of 400 min, a bond strength to steel of 3.7 N and a bond strength to the reverse of 1.6 N/cm. The residual solvent content is 2 g/m$_2$ and was determined by headspace GC.

With this experiment a quality comparable with that of Examples 1 and 2 was achieved, but part of the solvent was emitted to the environment in the course of drying the adhesive composition, while a further fraction remains in the product. Relative to Comparative Example 1, furthermore, Example 2 has the advantage of continuous preparation and coating of the adhesive composition, which was hitherto virtually impossible to implement with the solvent process.

Comparative Example 2

The formulation was made similarly to Example 1 but replacing the centrifuge latex by solid rubber (pale crepe, Wallace plasticity $P_0$ 43, K value 159, granulated with 3% talc to a size of 8–12 mm). The components were kneaded in a Banbury at 140° C. until the adhesive composition was virtually free from inhomogeneities. It is very soft and tacky, and the K value was measured at 95. Coating and testing took place as in Example 1. The holding power (method C) was measured at 20 minutes; in the bonding test, significant residues of adhesive composition were found over the whole area of the paint. In order to bring the holding power of the adhesive composition into a range suitable for use, an adhesive strip was subjected to electron beam treatment (dose: 50 kGy, acceleration voltage: 350 kV). By virtue of the irradiation the holding power was raised to 300 minutes. Despite the fact that this value is still not adequate for use, the bonding test was repeated. The adhesive tape tears while being peeled off. When the test was repeated, the same negative result was obtained. The paper has become brittle owing to the irradiation. A tear strength test on an unbonded sample strip showed that the tear strength fell only by 20% as a result of irradiation. The embrittlement occurs, however, as a result of heat treatment in the paint-drying oven. In a third bonding test, with extremely careful peeling, slight residues of adhesive composition were found over the entire area of the paint. Even stronger radiation crosslinking to improve further the holding power (method C) to >1000 min is pointless owing to the embrittlement of the impregnated paper. With a conventional process of preparing hot melt pressure-sensitive adhesives, such as is conventional when using thermoplastic rubbers such as SIS, for example, therefore, it is impossible to prepare a useful adhesive tape for painting.

Comparative Example 3

The adhesive composition was prepared as in Example 2 but with the following formulation.

| Raw material/supplier | % by weight |
|---|---|
| Natural rubber SMRL 5 | 46.0 |
| MBG 212/Hercules | 46.0 |
| Bevilite 20 L/Bergvik | 7.0 |
| Irganox 1010/Ciba-Geigy | 0.3 |
| Perkazit ZDBC/Akzo | 0.6 |

The resultant hot adhesive composition had a K value of 85. It was fed between a pair of rolls in a triple-roll applicator unit and was transferred to a 35 μm thick polypropylene film (MB 250, Mobil) against the third roll. The film was pretreated on one side with isocyanate and cyclorubber as adhesion promoter and on the other side with polyvinyl stearylcarbamate as a release layer. The resultant sample had an application rate of 28 g/m$^2$ and a holding power (method B) of 15 min. It was irradiated with electrons under nitrogen (dose: 50 kGy). This increased the holding power (method B) to 90 min, which is still much too low for a carton-sealing adhesive tape. An empty carton was sealed using the adhesive tape and placed by a window. The adhesive strip sheared off within a day and the cardboard box opened. After 4 weeks, the adhesive strip had become embrittled on the sun-facing side. Therefore, adhesive tape strips were stored under a Solila (sunlight) lamp. In this test setup, four lamps arranged in a square format at a distance of 10 cm from each other shine onto the samples, which have been placed on a metal plate heated at 30° C. at a distance of 30 cm from the lamps. The result was compared with that for a film sample which had been exposed neither to the electron beams nor to the lamps (defined as 100%), with measurement taking place in the machine direction (MD).

| Property | Film | Sample exposed to electron beams | Same plus 3 d Solila | Same plus 6 d Solila |
|---|---|---|---|---|
| Elongation at break | 100 | 60 | 32 | 6 |
| Tear strength | 100 | 92 | 53 | 32 |

The film is therefore extremely embrittled by a combination of electron beam and UV radiation. A carton-sealing tape with a natural rubber hot melt pressure-sensitive adhesive is therefore impossible unless the process of the invention is employed.

In a comparative test using an adhesive tape having the same backing film but without electron beam irradiation, the embrittlement did not occur.

Comparative Example 4

0.35 kg of Tixosil 331 (filler from Gustav Grolmann) and 0.1 kg of finely powdered Antioxidant BKF (antioxidant from Bayer) was stirred into 2.2 kg of a 10% strength by weight solution of Arkopal N 300 (emulsifier from Hoechst). A second vessel was charged with 5.9 kg of centrifuge latex, then 10.7 kg of Tacolyn 100 (tackifier resin dispersion from Hercules) were added and, finally, the pre-prepared Tixosil suspension was added with cautious stirring.

The finished adhesive composition was applied carefully using a hand-held coater to a 25 µm thick polyester film pretreated with cyclorubber and the coated film was dried in a circulating-air oven at 110° C. for 5 minutes. The application rate was measured at 18 g/m$^2$ and the bond strength is 1.3 N/cm.

A laboratory coating unit with coater bar was fed with the same film and the speed was set at 10 m/min. The temperature of the 4 m long tunnel was 130° C. The remaining adhesive composition was to be pumped in front of the coating bar. It was impossible to convey with a centrifugal pump, peristaltic pump or gear pump because the adhesive composition coagulated immediately. Therefore, the adhesive composition was made up again and poured slowly from a beaker in front of the coater bar. The first gel particles appeared on the web behind the coater bar after 20 seconds, and after 3 minutes the experiment had to be terminated since the coater bar was clogged with lumps.

What is claimed is:

1. Process for preparing a pressure-sensitive adhesive composition which has a K value of at least 80, wherein tackifiers in dispersed, melted or solid form are mixed with natural rubber latex, the water content being not more than 25% by weight, and the mixture is dried in a compounder or extruder by means of heat or subatmospheric pressure prior to further processing.

2. Process according to claim 1, wherein the pressure-sensitive adhesive composition has a K value of at least 125.

3. Process according to claim 2, wherein the pressure-sensitive adhesion composition has a K value of at least 140.

4. Process according to claim 1, wherein mixing is performed in a compounder or extruder.

5. Process according to claim 1, wherein the pressure-sensitive adhesive composition is dried by an extruder and the resultant melt is supplied continuously to an applicator unit.

6. Process according to claim 1, wherein the pressure-sensitive adhesive composition is fed to an extruder and a coating die.

7. Process according to claim 1, wherein the pressure-sensitive adhesive composition is fed to an extruder and a roll applicator unit.

8. Process according to claim 1, wherein antioxidants, fillers, pigments or plasticizers are also mixed with said natural rubber latex.

9. Process according to claim 1, wherein a solid or liquid rubber are also mixed with said natural rubber latex.

10. Process for producing an adhesive tape or label, wherein the pressure-sensitive adhesive composition obtained by the process of claim 1 is applied by direct or indirect coating to paper, film or fabric.

11. Adhesive tape or label produced by the process of claim 10.

12. Process for producing an adhesive tape or label, wherein the pressure-sensitive adhesive composition obtained by the process of claim 8 is applied by direct or indirect costing to paper, film or fabric.

13. Process for producing an adhesive tape or label, wherein the pressure-sensitive adhesive composition obtained by the process of claim 9 is applied by direct or indirect coating to paper, film or fabric.

14. The process of claim 1 wherein said process is a continuous process.

* * * * *

UNITED STATES PATENT AND TRADEMARK OFFICE
CERTIFICATE OF CORRECTION

PATENT NO. : 6,777,490 B2
DATED : August 17, 2004
INVENTOR(S) : Mussig et al.

It is certified that error appears in the above-identified patent and that said Letters Patent is hereby corrected as shown below:

Column 9,
Line 44, "$2g/m_2$" should read -- $2g/m^2$ --

Column 12,
Line 33, "costing" should read -- coating --

Signed and Sealed this

Twenty-sixth Day of July, 2005

JON W. DUDAS
*Director of the United States Patent and Trademark Office*